United States Patent
Morin et al.

(10) Patent No.: US 10,797,286 B2
(45) Date of Patent: Oct. 6, 2020

(54) THIN, HIGH DENSITY NONWOVEN SEPARATORS FOR ENERGY STORAGE DEVICES

(71) Applicants: Brian G. Morin, Greer, SC (US); Testa Mattia, Scaer (FR); Giovanni Schnelle, Nidda (DE)

(72) Inventors: Brian G. Morin, Greer, SC (US); Testa Mattia, Scaer (FR); Giovanni Schnelle, Nidda (DE)

(73) Assignees: Dreamweaver International Inc., Greer, SC (US); Glatfelter Gernsbach, GMBH, Gernsbach (DE)

( * ) Notice: Subject to any disclaimer, the term of this patent is extended or adjusted under 35 U.S.C. 154(b) by 665 days.

(21) Appl. No.: 15/054,120

(22) Filed: Feb. 25, 2016

(65) Prior Publication Data
US 2019/0273233 A1    Sep. 5, 2019

(51) Int. Cl.
*H01M 2/16* (2006.01)
*H01M 10/0525* (2010.01)

(52) U.S. Cl.
CPC ....... *H01M 2/162* (2013.01); *H01M 10/0525* (2013.01)

(58) Field of Classification Search
CPC .. H01M 2/162; H01M 2/145; H01M 10/0525; H01M 10/0565; H01M 10/058; H01G 11/56; H01G 11/52
See application file for complete search history.

(56) References Cited

U.S. PATENT DOCUMENTS

| | | | |
|---|---|---|---|
| 2014/0272599 A1* | 9/2014 | Morin | H01G 11/56 429/247 |
| 2015/0221916 A1* | 8/2015 | Lee | H01M 2/145 429/254 |
| 2016/0056435 A1* | 2/2016 | Takeda | H01M 2/1666 429/246 |

* cited by examiner

*Primary Examiner* — Stephen J Yanchuk
(74) *Attorney, Agent, or Firm* — William S. Parks

(57) ABSTRACT

An insulating (nonconductive) microporous nonwoven polymeric battery separator comprised of a single layer of enmeshed microfibers and nanofibers and supercalendered to extremely thin dimensions and high densities is provided. Such a separator accords the ability to not only attune the porosity and pore size to any desired level through a single nonwoven fabric, but provide further benefits in terms of further reduced pore size, reduced electrolyte level requirements, and reduced total volume of the subject battery cell itself. As a result, the inventive separator permits a high strength material with low porosity and low pore size to levels previously unattained. The separator, a battery including such a separator, the method of manufacturing such a separator, and the method of utilizing such a separator within a battery device, are all encompassed within this invention.

18 Claims, 5 Drawing Sheets

(COMPARATIVE PRIOR ART)

(COMPARATIVE PRIOR ART)

THIN, HIGH DENSITY NONWOVEN SEPARATORS FOR ENERGY STORAGE DEVICES

FIELD OF THE INVENTION

The present invention relates to an insulating (nonconductive) microporous nonwoven polymeric battery separator comprised of a single layer of enmeshed microfibers and nanofibers and supercalendered to extremely thin dimensions and high densities. Such a separator accords the ability to not only attune the porosity and pore size to any desired level through a single nonwoven fabric, but provide further benefits in terms of further reduced pore size, reduced electrolyte level requirements, and reduced total volume of the subject battery cell itself. As a result, the inventive separator permits a high strength material with low porosity and low pore size to levels previously unattained. The separator, a battery including such a separator, the method of manufacturing such a separator, and the method of utilizing such a separator within a battery device, are all encompassed within this invention.

BACKGROUND OF THE INVENTION

Batteries have been utilized for many years as electrical power generators in remote locations. Through the controlled movement of electrolytes (ions) between electrodes (anode and cathode), a power circuit is generated, thereby providing a source of electricity that can be utilized until the electrolyte source is depleted and no further electrical generation is possible. In more recent years, rechargeable batteries have been created to allow for longer lifetimes for such remote power sources, albeit through the need for connecting such batteries to other electrical sources for a certain period of time. All in all, however, the capability of reusing such a battery has led to greater potentials for use, particularly through cell phone and laptop computer usage and, even more so, to the possibility of automobiles that solely require electricity to function.

Such batteries typically include at least five distinct components. A case (or container) houses everything in a secure and reliable manner to prevent leakage to the outside as well as environmental exposure inside. Within the case are an anode and a cathode, separated effectively by a separator, as well as an electrolyte solution (low viscosity liquid) that transport over and/or through the separator between the anode and cathode. The rechargeable batteries of today and, presumably tomorrow, will run the gamut of rather small and portable devices, but with a great deal of electrical generation potential in order to remain effective for long periods between charging episodes, to very large types present within automobiles, as an example, that include large electrodes (at least in surface area) that must not contact one another and large amounts of electrolytes that must consistently and constantly pass through a membrane to complete the necessary circuit, all at a level of power generation conducive to providing sufficient electricity to run an automobile engine. As such, the capability and versatility of battery separators in the future must meet certain requirements that have yet to be provided within the current industry.

Generally speaking, battery separators have been utilized since the advent of closed-cell batteries to provide necessary protection from unwanted contact between electrodes as well as to permit effective transport of electrolytes within power generating cells. Typically, such materials have been of film structure, sufficiently thin to reduce the weight and volume of a battery device while imparting the necessary properties noted above at the same time. Such separators must exhibit other characteristics, as well, to allow for proper battery function. These include chemical stability, suitable porosity of ionic species, effective pore size for electrolyte transfer, proper permeability, effective mechanical strength, and the capability of retaining dimensional and functional stability when exposed to high temperatures (as well as the potential for shutdown if the temperature rises to an abnormally high level).

In greater detail, then, the separator material must be of sufficient strength and constitution to withstand a number of different scenarios. Initially, the separator must not suffer tears or punctures during the stresses of battery assembly. In this manner, the overall mechanical strength of the separator is extremely important, particularly as high tensile strength material in both the machine and cross (i.e., transverse) directions allows the manufacturer to handle such a separator more easily and without stringent guidelines lest the separator suffer structural failure or loss during such a critical procedure. Additionally, from a chemical perspective, the separator must withstand the oxidative and reductive environment within the battery itself, particularly when fully charged. Any failure during use, specifically in terms of structural integrity permitting abnormally high amounts of electrolyte to pass or for the electrodes to touch, would destroy the power generation capability and render the battery totally ineffective. Thus, even above the ability to weather chemical exposure, such a separator must also not lose dimensional stability (i.e., warp or melt) or mechanical strength during storage, manufacture, and use, either, for the same reasons noted above.

Simultaneously, however, the separator must be of proper thickness to, in essence, facilitate the high energy and power densities of the battery, itself. A uniform thickness is quite important, too, in order to allow for a long life cycle as any uneven wear on the separator will be the weak link in terms of proper electrolyte passage, as well as electrode contact prevention. The ability, however, to provide an extremely thin, uniform dimension, within such battery separators has proven to be rather difficult, particularly since a thickness reduction of an already thin structure tends to compromise separator strength. Film separator structures may accord a certain thin dimension due to facilitation of production of such structures; nonwoven separators, to the contrary, are difficult to manufacture at a thin dimension without losing integrity and, as is generally accepted, increasing the pore sizes therein.

Additionally, with regard to pore sizes, such a battery separator must exhibit proper porosity and pore sizes to accord, again, the proper transport of ions through such a membrane (as well as proper capacity to retain a certain amount of liquid electrolyte to facilitate such ion transfer during use). The pores themselves should be sufficiently small to prevent electrode components from entering and/or passing through the membrane, while also allowing, again, as noted above, for the proper rate of transfer of electrolyte ions therethrough. As well, uniformity in pore sizes, as well as pore size distribution, provides a more uniform result in power generation over time as well as more reliable long-term stability for the overall battery as, as discussed previously, uniform wear on the battery separator, at least as best controlled in such a system, allows for longer life-cycles. It additionally can be advantageous to ensure the pores therein may properly close upon exposure to abnormally high temperatures to prevent excessive and undesirable ion transfer upon such a battery failure (i.e., to prevent fires and other like hazards). Thus, providing uniformly small pore sizes (and thus proper porosity measurements for such a purpose) within a thin, dense nonwoven structure has yet to be explored. Film structures, again, may be manufactured to certain dimensions, but porosity reductions are designed in for such separators, rather than produced or at least modified through further treatments past initial manufacture. In any event, in terms of nonwoven separators, there remains a drive for very low pore sizes, at least to provide beneficial protections in terms of electrode contact.

As well, the pore sizes and distributions may increase or decrease the air resistance of the separator, thus allowing for simple measurements of the separator that indicate the ability of the separator to allow adequate passage of the electrolyte present within the battery itself. For instance, mean flow pore size can be measured according to ASTM E-1294, and this measurement can be used to help determine the barrier properties of the separator. Thus, with low pore size, the rigidity of the pores themselves (i.e., the ability of the pores to remain a certain size during use over time and upon exposure to a set pressure) allows for effective control of electrode separation as well, as noted above. More importantly, perhaps, is the capability of such pore size levels to limit electrolyte permeability in order to reduce the chances of crystal formation on an anode (such a lithium crystals on a graphite anode) that would impair the generation of the necessary circuit and deleteriously impact the power generation capability of the battery over time. The smaller the pore sizes within the dimensional stable thin and dense separator would ostensibly provide such benefits and reduce, or at least retard, dendritic formations on the electrodes (which could cause shorts within the circuit).

Furthermore, the separator must not impair the ability of the electrolyte to completely fill the entire cell during manufacture, storage and use. Thus, the separator must exhibit proper wicking and/or wettability during such phases in order to ensure the electrolyte in fact may properly generate and transfer ions through the membrane; if the separator were not conducive to such a situation, then the electrolyte would not properly reside on and in the separator pores and the necessary ion transmission would not readily occur, at least in theory. The smaller the separator, the better, in other words. Providing a strong, thin, and dense structure would be highly desirable, certainly, for this purpose.

The general aim of an effective battery separator, then, is to provide low air resistance and, simultaneously, very low pore size, in order to accord a material that drastically reduces any potential for electrode contact, but with the capability of controlled electrolyte transport from one portion of the battery cell to the other (i.e., closing the circuit to generate the needed electrical power). Currently, such properties are not effectively provided in tandem. For instance, Celgard has disclosed and marketed an expanded film battery separator with very low pore size, which is very good, as noted above; however, the corresponding air resistance for such a material is extremely high, thus limiting the overall effectiveness of such a separator. Even with a thin structure, then, there are deleterious results that may render such separators less effective and reduce certain durability measurements. To the contrary, duPont commercializes a nanofiber nonwoven membrane separator that provides very low air resistance, but with very large pore sizes therein. Thus, dendritic formations of the electrolyte on the anode, at least, may cause problems, as well. Additionally, the overall mechanical strengths exhibiting by these two materials are very limiting; the Celgard separator has excellent strength in the machine direction, but nearly zero in the cross (transverse) direction. Such low cross direction strength requires very delicate handling during manufacture, at least, as alluded to above. The duPont materials fare a little better, except that the strengths are rather low in both directions, albeit with a cross direction that is higher than the Celgard material. In actuality, the duPont product is closer to an isotropic material (nearly the same strengths in both machine and cross directions), thus providing a more reliable material in terms of handling than the Celgard type. However, the measured tensile strengths of the duPont separator are quite low in effect, thus relegating the user to carefully maneuvering and placing such materials during manufacture as well. Likewise, the dimensional stability of such prior battery separators are highly suspect due to these tensile strength issues, potentially leading to materials that undesirably lose their structural integrity over time when present within a rechargeable battery cell.

New types of battery separators have been provided the industry in terms of single layer nonwovens having enmeshed microfiber and nanofiber constituents. Such structures allow, depending on certain manufacturing steps and procedures, a user to dial in a desired level of porosity with effective isotropic strength levels. Such separators are effective in terms of air resistance, as well, providing highly desirable structures within the lithium ion and other like battery markets. A drawback does exist, however, in terms of thickness and possible lower pore size levels. As single layer structures these bi-component fiber nonwovens are quite thin and permit a certain increase in battery cell component volume as a result. However, the thicknesses of such structures may require a certain level of material introduction that may compromise certain battery effectiveness overall.

Thus, there still exists a need to provide a battery separator that provides simultaneously low air resistance and low pore size, as well as high tensile strength overall and at relatively isotropic levels, all while exhibiting proper chemical stability, structural integrity, dimensional stability, and ease in manufacture, and at a thickness level that accords maximum volume within a battery cell. Additionally, a manner of producing battery separators that allows for achieving targeted property levels (such as a specific range of pore sizes and/or a specific range of air resistance measurements) through minor modifications in manufacturing would permit greater versatility to meet battery manufacturer requirements on demand; currently, such a manufacturing method to such an extent has yet to be explored throughout the battery separator industry. As such, an effective and rather simple and straightforward battery separator manufacturing method in terms of providing any number of membranes exhibiting such versatile end results (i.e., targeted porosity and air resistance levels through processing modifications on demand) as well as necessary levels of mechanical properties, heat resistance, permeability, dimensional stability, shutdown properties, and meltdown properties, is prized within the rechargeable battery separator industry; to date, such a material has been unavailable.

Advantages and Summary of the Invention

A distinct advantage of the present invention is the ease in manufacturing through a wetlaid nonwoven fabrication process followed by a supercalendering procedure. Another distinct advantage is the resulting capability of providing any targeted level of pore size, porosity, and air resistance, through the mere change in proportions of component fibers utilized during the fabrication process, as well as through the compression forces applied through such a supercalendering process. Yet another advantage of this inventive battery separator is the increased energy density provided through such a supercalendered structure, with simultaneous reduction of pore sizes from its initial manufactured state, unexpectedly. The ability of such a supercalendered structure to reduce dendrite formation on electrodes in relation to electrolyte is yet another advantage herein. The ability to reduce the total volume of a battery cell with a thin, dimensionally stable separator of this type, is another significant advantage, as well. The inventive separator to provide contemporaneous low air resistance and extremely low pore sizes with a stronger, yet thinner, structure in comparison with an initially manufactured nonwoven structure, is still a further advantage of this invention. Yet another advantage of this inventive battery separator is the provision of a specifically non-conductive (and thus insulating) fabric that does not allow transmission of electrical charge through the separator body, but solely through the transport of charged ions through the pores present within its structure. Yet another advantage is the high porosity of the material, allowing the user to reduce the amount of electrolyte actually needed for proper battery function.

Accordingly, this invention pertains to a polymeric battery separator comprising a nonwoven combination of microfibers and nanofibers, wherein said separator provides sufficient porosity for electrolyte transfer therethrough and suitable prevention of electrode contact through a single layer of said nonwoven combination, wherein said separator exhibits a maximum thickness of 25 microns (preferably 20, more preferably 15, and most preferably 12 microns), a maximum porosity of 45% (preferably 40, more preferably 35, and most preferably 30%), a maximum mean flow pore size of 0.7 microns (preferably 0.6, more preferably 0.5, and most preferably 0.4 microns), a minimum tensile strength of 2 kN/cm$^2$ (preferably 2.5, more preferably 3.0, and most preferably 3.5 kN/cm$^2$), a minimum tensile strength of 0.6 kN/m (preferably 0.7, more preferably 0.8, and most preferably 0.85 kN/m), a minimum apparent density of 0.7 g/cm$^3$ (preferably 0.8, more preferably 0.8, and most preferably 0.85 g/cm$^3$). Also encompassed herein is a method of manufacturing a single-layer polymeric battery separator, said method comprising the steps of:

providing a plurality of polymeric microfibers having a maximum length of 25 mm and a minimum size of 2 microns;

providing a plurality of polymeric nanofibers having a maximum length of 25 mm and a maximum size of 700 nanometers;

subjecting said plurality of polymeric microfibers and nanofibers simultaneously to a wetlaid nonwoven fabricating method such that said polymeric microfibers enmesh in a nonuniform pattern with interstices between said microfibers and said polymeric nanofibers become entangled with said microfibers and said other nanofibers such that said nanofibers and introduced within said interstices between the microfibers as well as on the surface of the substrate formed from said polymeric microfibers; and subjecting said enmeshed structure to a supercalendaring procedure, wherein said procedure entails contact with at least three calendaring nips, and wherein each calendaring nip applies pressure of at least 500 lbs/inch. A battery including such an insulating separator as above and/or manufactured through the defined process is likewise encompassed within this invention, as is the method of utilizing such a battery to generate electricity in a rechargeable device.

Throughout this disclosure, the term microfiber is intended to mean any polymeric fiber exhibiting a width that is measured in micrometers, generally having a fiber diameter greater than 1000 nm, but also greater than 3000 nm, or even greater than 5000 nm or possibly even greater than 10,000 nm, up to about 40 microns. As well, the term nanofiber is intended to mean any polymeric fiber exhibiting a width that is measured in nanometers, generally having a diameter less than 1000 nm, but possibly less than 700 nm, or even less than 500 nm or possibly even less than 300 nm. As well, the term insulating in intended to indicate no appreciable degree of electrical conductivity, and thus the inventive fabric structure does not permit electrical charge throughout the fabric body, but only through the passage of electrolytic ions through the pores present therein.

Such a combination of microfibers and nanofibers has yet to be investigated within the battery separator art, particularly in terms of the capability of providing a single-layer nonwoven fabric of the two base components for such a purpose. The microfiber constituent may be of any suitable polymer that provides the necessary chemical and heat resistance alluded to above, as well as the capability of forming a microfiber structure. As well, such a microfiber may also be fibrillated (or treated in any other like manner, such as through plasma exposure, and the like) during or subsequent to fiber formation in order to increase the surface area thereof to facilitate the desired entangling between a plurality of such microfibers during a nonwoven fabrication process. Such polymeric components may thus include acrylics such as polyacrylonitrile, polyolefins such as polypropylene, polyethylene, polybutylene and others including copolymers, polyamides, polyvinyl alcohol, polyethylene terephthalate, polybutylene terephthalate, polysulfone, polyvinyl fluoride, polyvinylidene fluoride, polyvinylidene fluoride-hexafluoropropylene, polymethyl pentene, polyphenylene sulfide, polyacetyl, polyurethane, aromatic polyamide, semi-aromatic polyamide, polypropylene terephthalate, polymethyl methacrylate, polystyrene, cellulosic polymers (rayon, as one non-limiting example), polyaramids, including para-aramids and meta-aramids, and blends, mixtures and copolymers including these polymers. Polyacrylates, cellulosic polymers, and polyaramids are potentially preferred.

The fibers may also be pre-treated with adhesives to effectuate the desired degree of contact and dimensional stability of the overall nonwoven structure subsequent to fabrication.

Additionally, the microfibers may be selected in terms of individual fiber properties to provide combinations of materials that accord desirable characteristics to the overall battery separator. Thus, since poly-aramid, meta-aramid, and cellulosic fibers provide excellent heat resistance and certain strength benefits, such fibers may be incorporated individually (as wet-laid constituents, for example) or in combination through entanglement or other means. Such fibers must be of sufficient length to impart the necessary strength to the overall separator but short enough to permit proper incorporation (such as, again, for instance, within a wet-laid procedure). For instance, they may preferably be longer than 0.5 mm, more preferably longer than 1 mm, and most preferably longer than 2 mm.

Microfibers or nanofibers may preferentially be of a material that will melt or flow under pressure or high temperature. It is of particular benefit to have one constituent which will melt or flow at a temperature that is lower than the other constituents. For example, polyester microfibers can be made to flow at temperatures approaching the melt temperature of 260° C. Additionally, polyacrylonitrile microfibers or nanofibers can be made to flow under high pressure and temperature. Cellulose, rayon, aramid, and other micro- or nanofibers will not flow under these temperatures. Thus, a combination of materials comprising at least one fiber that will flow under high temperature and/or pressure and at least one fiber that will not flow under the same temperature and/or pressure will enable the first fiber to bond the other fibers together, imparting additional strength to the nonwoven separator.

The nanofibers may thus be of any like polymer constituency in order to withstand the same types of chemical and high temperature exposures as for the microfibers. Due to their size, there is no requirement of post-manufacture treatment of such nanofiber materials to accord any increase in entanglement on the produced nonwoven surface or within the interstices thereof. Importantly, however, is the necessity that the nanofibers combine with the microfibers under a sufficiently high shear environment to accord the desired introduction of such nanofibers onto and within the resultant microfiber nonwoven substrate simultaneously with actual nonwoven fabrication itself. In other words, upon the provision of both types of fiber materials within the nonwoven production process, the manufacturer should accord a sufficient amount of mixing and under high shear conditions to best ensure the proper degree of entanglement between the different fiber types to form the desired single-layer fabric structure. As well, the fabrication method is potentially preferred as a wetlaid nonwoven procedure in addition to the high shear type, ostensibly to best ensure the proper introduction and residual location of nanofibers within the microfiber interstices. With an increased water flow during manufacture, the extremely small nanofibers will be drawn into such interstices at a greater rate than with a dry entanglement method, thereby according the aforementioned interstice fill capability. The resultant nonwoven structure would thus exhibit greater uniformity in terms of thickness, porosity, and, most importantly, pore sizes, therein.

Other methods of nonwoven sheet manufacture which enable the entanglement of a combination of nanofibers and microfibers may also be used to create the inventive battery separators. Such methods include carding, cross lapping, hydroentangling, air laid, needlepunch, or other methods that enable the microfibers to form an entangled mesh and the nanofibers to fill the interstices between said microfibers.

In effect, the microfiber interstices form the "pores" per se, and the nanofibers fill in such openings to reduce the sizes therein, and to a substantially uniform degree over the entire nonwoven structure. Of highly unexpected benefit to the overall invention, particularly in terms of targeting different levels of porosity on demand, is the ability to dial in pore sizes within the resultant nonwoven structure through the mere modification of the concentration of microfibers to nanofibers alone. Thus, for example, a 30% microfiber to 70% nanofiber proportion at the nonwoven fabrication process outset would provide a pore size in the range of 700 nm to 195 nm, whereas a 10% microfiber/90% nanofiber combination would provide an effectively smaller pore size distribution (as well as a more uniform range thereof, for example 230 nm to 130 nm). Such an unforeseen result thus accords an on-demand porosity result for the end user through, as noted, as rather simple manufacturing modification. Such pore sizes created can be measured, resulting in a mean flow pore size. Such mean flow pore sizes may be less than 2000 nm, even less than 1000 nm, preferably less than 700 nm, more preferably less than 500 nm.

Additionally, however, the manufacturer would subject the nonwoven structure to a supercalendering operation in order to effectively reduce the thickness thereof to extremely low levels, as well as increase the density of the separator. A supercalender is a stack of calender rolls, sometimes consisting of alternating metal rolls and fiber-covered rolls, through which a sheet can be passed through multiple nips. The rolls could also possibly be all fiber-covered rolls, or all metal rolls, or any combination of fiber-covered and metal rolls. The covering of fiber-covered rolls is traditionally made from compressed paper or compressed cotton, but another material of suitable compressibility may be used. Traditionally, supercalendering is performed offline from the paper machine, but the successive nips are in line with each other. However, it may be possible to supercalender in-line with the paper machine, or to do successive calendering operations to achieve similar results.

The rolls generally are heated to increase the effect of the pressure, though they can be used without adding heat. If heat is used, it is preferential to use a temperature above 100 C, more preferential above 125 C, and even more preferential above 150 C. Pressure is applied to the nips through which the paper passes. A suitable pressure is over 250 pounds per linear inch (pli), preferentially above 500 pli, more preferentially above 1000 pli. In addition, prior to supercalendering, the material is sometimes moistened with water or other solvent to enable the fibers to retain their calendered state better.

Prior work has been undertaken of straightforward calendaring procedures for treatment of nonwoven separator structures; such a process is limited in scope to application of far lower pressures and forces on the subject nonwoven. In this instance, the application of pressures and forces are significantly higher than ever attempted on such nonwoven bi-component structures in the past, particularly in terms of the utilization of at least three calender nips at a minimum of 500 lbs/ft pressure. As a result, typical calendaring approaches have resulted in thicknesses of 250 microns, possibly as low as 50. In this situation, the supercalendering operation suitably takes the already thin structure and reduces the thickness (with concurrent density increase) to at most about 25 microns, preferably lower (20, 15, and even lower than 12 microns in measure). As noted above, the capability of preventing contact between the anode and cathode of the battery is necessary to prevent a shorted circuit during battery use; the thickness of the separator and the controlled pore size therein provide the essential manner of achieving such a result. However, battery separator thickness may also contribute to the available volume of other component parts within the closed battery cell as well as the amount of electrolyte solution provided therein. The entirety of the circumstances involved thus require an effective separator in terms of multiple variables. The beneficial ease of manufacture as well as the capability of providing effective on-demand pore size and air resistance properties through the inventive manufacturing method and the resultant single-layer battery separator made from such a bi-component nonwoven structure and subsequent supercalendering treatment thereto thus sets this development distinctly apart from the state of the art battery separators currently used and marketed today.

Additionally, it should be noted that although a supercalendered single-layer separator including microfibers and nanofibers together is encompassed within this invention, the utilization of multiple layers of such a fabric structure, or of a single layer of such an inventive battery separator fabric with at least one other layer of a different type of fabric, may be employed and still within the scope of the overall invention described herein. Additionally, if desired, such separators may be coated or otherwise treated with materials (such as ceramic sprays, for example) that accord certain other properties to the structure itself.

Such battery separators as described herein are clearly useful for improving the art of primary and rechargeable batteries, but also may be used for other forms of electrolyte conducting energy storage techniques, such as capacitors, supercapacitors, and ultracapacitors. Indeed, the control allowed on the pore size for such inventive separators may allow significant improvements in the energy loss, power discharge rate, and other properties of these devices.

DETAILED DESCRIPTION OF THE DRAWINGS AND PREFERRED EMBODIMENTS

Figure 1:
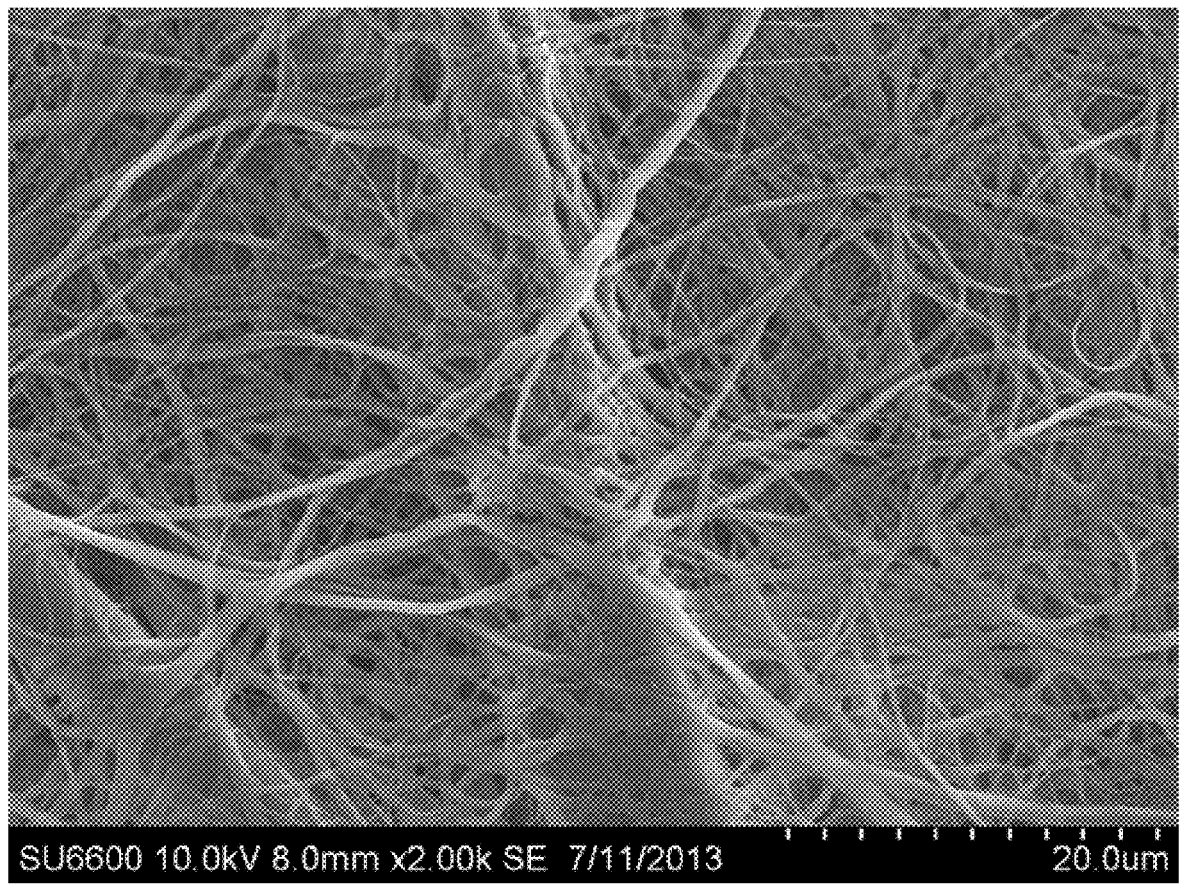
FIGS. 1 and 2 are SEMs microphotographs of comparative prior art nonwoven battery separator in a calendered state.

All the features of this invention and its preferred embodiments will be described in full detail in connection with the following illustrative, but not limiting, drawings and examples. In no manner has the description of the inventive separators and battery cells made therewith been made herein in any attempt to limit the scope thereof.

Microfiber and Nanofiber Production

As noted above, the microfiber may be constructed from any polymer (or polymer blend) that accords suitable chemical and heat resistance in conjunction with internal battery cell conditions, as well as the capability to form suitable fiber structures within the ranges indicated, and further the potential to be treated through a fibrillation or like technique to increase the surface area of the fibers themselves for entanglement facilitation during nonwoven fabrication. Such fibers may be made from longstanding fiber manufacturing methods such as melt spinning, wet spinning, solution spinning, melt blowing and others. In addition, such fibers may begin as bicomponent fibers and have their size and/or shape reduced or changed through further processing, such as splittable pie fibers, islands-in-the-sea fibers and others. Such fibers may be cut to an appropriate length for further processing, such lengths may be less than 1 inch, or less than ½ inch, or less than ¼ inch even. Such fibers may also be fibrillated into smaller fibers or fibers that advantageously form wet laid nonwoven fabrics.

Nanofibers for use in the current invention may be made through several longstanding techniques to make nanofibers. One example includes islands-in-the-sea, such as the Nano-Front fiber available from Teijin which are polyethylene terephthalate fibers with a diameter of 700 nm. Hills also makes and sells equipment that enables islands-in-the-sea nanofibers. Another example would be centrifugal spinning. Dienes and FiberRio are both marketing equipment which would provide nanofibers using the centrifugal spinning technique. Another example is electrospinning, such as practiced by DuPont, E-Spin Technologies, or on equipment marketed for this purpose by Elmarco. Still another technique to make nanofibers is to fibrillate them from film or from other fibers. Nanofibers fibrillated from films are disclosed in U.S. Pat. Nos. 6,110,588, 6,432,347 and 6,432,532, which are incorporated herein in their entirety by reference. Nanofibers fibrillated from other fibers may be done so under high shear, abrasive treatment. Nanofibers made from fibrillated cellulose and acrylic fibers are marketed by Engineered Fiber Technologies under the brand name EFTEC™. Any such nanofibers may also be further processed through cutting and high shear slurry processing to separate the fibers an enable them for wet laid nonwoven processing. Such high shear processing may or may not occur in the presence of the required microfibers.

Nanofibers that are made from fibrillation in general have a transverse aspect ratio that is different from one, such transverse aspect ratio described in full in U.S. Pat. No. 6,110,588, which is incorporated herein by reference. As such, in one preferred embodiment, the nanofibers have a transverse aspect ratio of >1.5:1, preferably >3.0:1, more preferably greater than 5.0:1.

As such, acrylic and polyolefin fibers are particularly preferred for such a purpose, with fibrillated acrylic fibers, are even more particularly preferred. Again, however, this is provided solely as an indication of a potentially preferred type of polymer for this purpose and is not intended to limit the scope of possible polymeric materials or polymeric blends for such a purpose.

Figure 3:
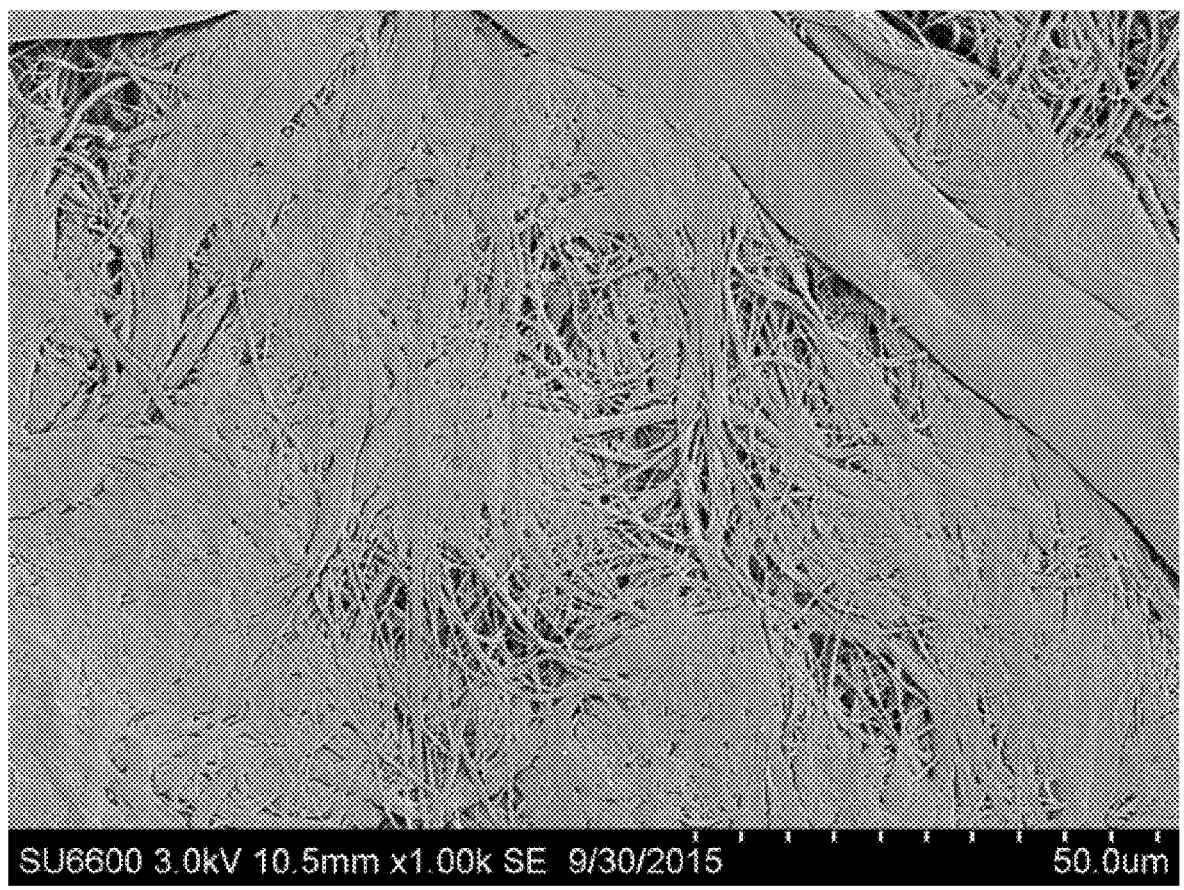
FIGS. 3 and 4 are SEMs microphotographs of inventive supercalendered microfiber and nanofiber nonwoven fabric battery separator.
Figure 4:
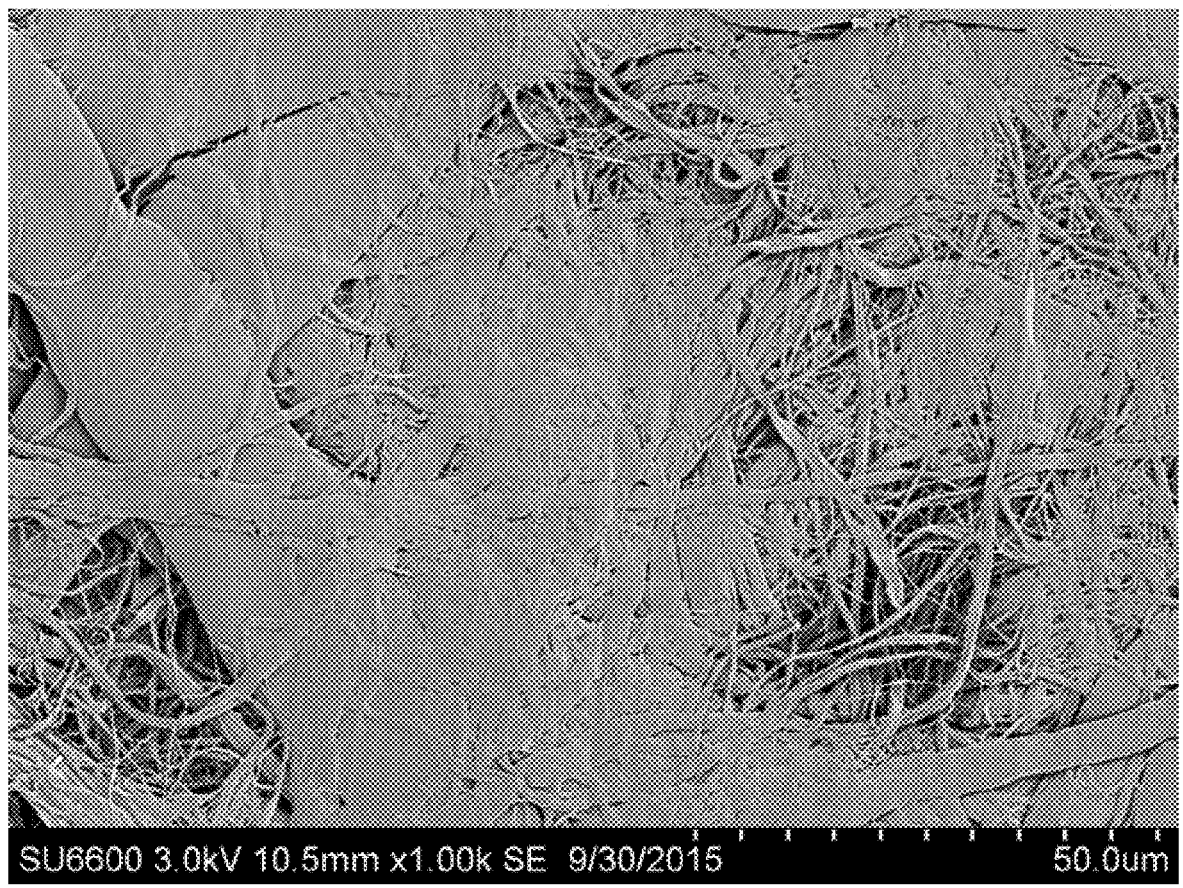
Figure 5:
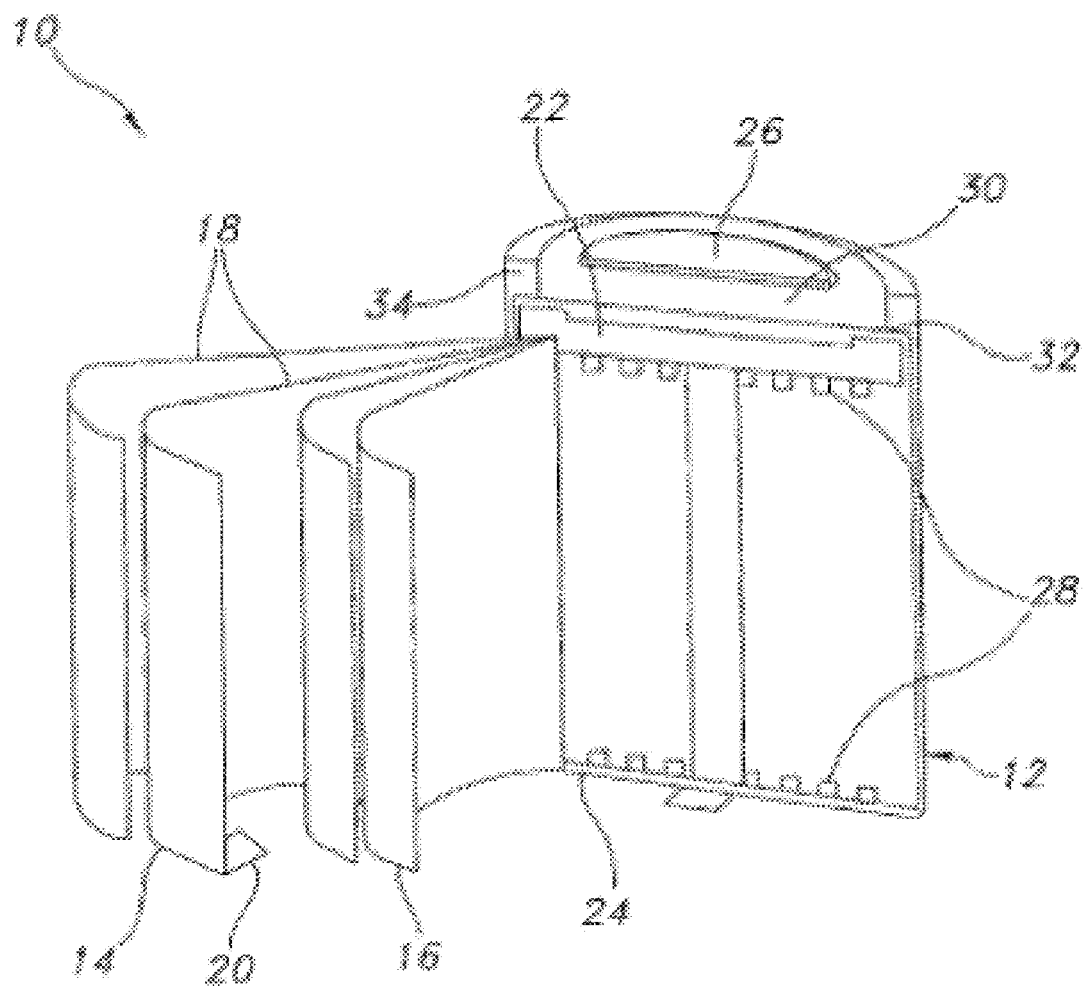
FIG. 5 shows an exploded view of an inventive rechargeable lithium ion battery including an inventive battery separator.

One particular embodiment of the combination of microfiber and nanofibers is the EFTEC™ A-010-4 fibrillated polyacrylonitrile fibers, which have high populations of nanofibers as well as microfibers. Nonwoven sheets made of these materials are shown in FIGS. 3 and 4. By way of example, these fibers can be used as a base material, to which can be added further microfibers or further nanofibers as a way of controlling the pore size and other properties of the nonwoven fabric. Examples of such sheets with additional microfibers added are shown in FIGS. 5, 6 and 7. Typical properties of the acrylic Micro/Nanofibers are shown below.

TABLE 1

| Acrylic Micro/Nanofiber Properties | |
|---|---|
| Density, g/cm$^3$ | 1.17 |
| Tensile Strength, MPa | 450 |
| Modulus, GPa | 6.0 |
| Elongation, % | 15 |
| Typical Fiber Length, mm | 4.5-6.5 |
| Canadian Standard Freeness, ml | 10-700 |
| BET Surface Area, m$^2$/g | 50 |
| Moisture Regain, % | <2.0 |
| Surface Charge | Anionic |

Such fibers are actually present in a pulp-like appearance thereby facilitating introduction within a wetlaid nonwoven fabric production scheme.

Nonwoven Separator Production Method

Material combinations were then measured out to provide differing concentrations of both components prior to introduction together into a wetlaid manufacturing process. Handsheets were made according to TAPPI Test Method T-205, which is incorporated here by reference. Several different combinations were produced to form final nonwoven fabric structures.

Separators, both comparative and inventive, were then prepared in accordance with the following examples:

Such separator examples were prepared using 0.5 denier polyvinyl alcohol (PVA) fibers at 3 mm length and EFTec L-010-04 fibrillated lyocell nanofibers. The EFTec was dispersed using a high speed industrial hydropulper, and then PVA fibers were mixed in using a Valley Beater so that the final ratio of fiber materials was 40% PVA and 60% Lyocell. This formed the pulp that was fed into the paper machine.

The uncalendered paper was made using an industrial flat wire paper machine such as is common in the industry, using common papermaking settings for light weight sheets. This uncalendered material is Comparative Example 1 and the properties of such a material are in Table 1, below.

Part of the separator material was then calendered at 300 C and 300 m/min between a steel roll and a hard rubber roll at pressure 1000 lbs/inch. This is Comparative Example 2, and the properties are shown in Table 1, below, as well.

Another part of the material was then also furthered calendered on a supercalender at 300 C, at 100 m/min, at stack pressure of 1500 lbs/inch. The supercalender consists of 4 nips, each between steel and hard rubber rolls. This supercalendered material is Inventive Example 1, and the properties are shown in Table 1, below.

TABLE 1

Measurements of Separators

| | Units | Comparative Example 1 | Comparative Example 2 | Inventive Example 1 |
|---|---|---|---|---|
| PVA | % | 40% | 40% | 40% |
| L-010-04 | % | 60% | 60% | 60% |
| Average Material Density | $g/cm^3$ | 1.36 | 1.36 | 1.36 |
| Basis Weight | $g/cm^2$ | 19.78 | 19.78 | 19.75 |
| Moisture | % | 6.9 | 6.1 | 7.3 |
| Thickness (7.3 psi) | μm | 48 | 34 | 21 |
| Thickness (12.6 psi) | μm | 46 | 32 | 19 |
| Thickness (25 psi) | μm | 43 | 32 | 19 |
| Apparent Density (7.3 psi) | $g/cm^3$ | 0.412 | 0.582 | 0.940 |
| Apparent Density (12.6 psi) | $g/cm^3$ | 0.43 | 0.618 | 1.039 |
| Apparent Density (25 psi) | $g/cm^3$ | 0.46 | 0.618 | 1.039 |
| Porosity (7.3 psi) | % | 70% | 57% | 31% |
| Porosity (12.6 psi) | % | 68% | 55% | 24% |
| Porosity (25 psi) | % | 66% | 55% | 24% |
| MD Tensile Strength | kN/m | 0.48 | 0.58 | 0.86 |
| MD Tensile Strength (12.6 psi) | $kN/cm^2$ | 1.04 | 1.81 | 4.53 |
| MD Tensile Stretch | % | 1.89 | 2.63 | 2.33 |
| CD Tensile Strength | kN/m | 0.31 | 0.33 | |
| CD Tensile Strength (12.6 psi) | $kN/cm^2$ | 0.67 | 1.03 | |
| CD Tensile Stretch | % | 2.80 | 3.13 | |
| Gurley | Sec/100 cc | 35 | 63 | 261 |
| Mean Flow Pore Size | μm | 0.85 | 0.76 | 0.52 |
| Bubble Point | μm | 3.55 | 6.28 | 5.08 |

These measurements are defined as follows:
a) Average material density is 1/(% PVA/dens(PVA)+% L/dens(L)), where % PVA is the proportion of PVA fiber, the dens(PVA) is the density of PVA in $g/cm^3$, the % L is the proportion of lyocell (in %) and the dens(L) is the density of lyocell in $g/cm^3$.
b) Apparent density is Basis weight/thickness as measured at a given foot pressure
c) Porosity is 1−Apparent density/Average material density
d) Tensile Strength (12.6 psi) is Tensile Strength/Thickness where the thickness used is that measured at a foot pressure of 12.6 psi.

From the above table it is evident that the inventive separator is stronger, is thinner, has lower pore size, and has lower porosity and higher density than the comparative examples. One key benefit is the reduced amount of electrolyte necessary to fill the separator due to the greatly reduced porosity and thickness, greatly reducing the cost of the materials that go into the supercapacitor.

In terms of the inventive separators made herein through the supercalendering process, the following Table 2 provides parameters (ranges) of the thickness, porosity, mean flow pore size, tensile strengths, apparent density, fiber size, fiber length, calender nips, and calender pressures pertaining to manufacture thereof.

TABLE 2

Property Ranges of Inventive Seperators

| Parameter | Units | Qualifier | Range | Preferably | More Preferably | Most Preferably |
|---|---|---|---|---|---|---|
| Thickness | μm | Below | 25 | 20 | 15 | 12 |
| Porosity | % | Below | 45 | 40 | 35 | 30 |
| Mean Flow Pore Size | μm | Below | 0.7 | 0.6 | 0.5 | 0.4 |
| Tensile Strength | $kN/cm^2$ | Above | 2 | 2.5 | 3 | 3.5 |
| Tensile Strength | kN/m | Above | 0.6 | 0.7 | 0.8 | 0.85 |
| Apparent Density | $g/cm^3$ | Above | 0.7 | 0.8 | 0.9 | 1.0 |
| Fiber size | μm | Below | 2 | 1 | 0.7 | 0.5 |
| Fiber length | mm | Below | 25 | 12 | 8 | 5 |
| Calender nips | # | Above | 3 | 4 | 5 | |
| Calender pressure | Lbs/inch | Above | 500 | 1000 | 1500 | 2000 |

Thus, from this table, the thickness should be below 25 microns, preferably below 20 microns, more preferably below 15 microns, and most preferably below 12 microns. Each of the other parameters can be read in a parallel fashion.

Figure 2:

The comparative and inventive separators were further analyzed under scanning electron microscopy. SEM micrographs were taken of the separators for Comparative Example 2, and Inventive Example 1, and are shown below. It is clear that the inventive separator shows significant differences in physical appearance, particularly in terms of higher density, lower porosity and smaller pore size. These micrographs are shown in FIGS. 1 and 2.

Battery Separator Base Analysis; Super Capacitor and Lithium Ion Battery Testing Supercapacitors were prepared using a commercial separator, TF 4030 available from Nippon Kodashi (NKK), Comparative Example 2, above, and Inventive Example 1, above. The supercapacitor electrodes were obtained by disassembling a Maxwell 3000 F supercapacitor and washing the electrodes with acetonitrile, then drying. Cells were made by cutting electrodes into approximately 2"×3" plates, and then making a sandwich of two electrodes with the separator in the middle. The sandwich was placed in a pouch, filled with electrolyte consisting of 1 M (tetraethylammonium tetrafluoroborate) salt in acetonitrile solvent, and sealed. The cells were then charged to 2.8 V and held for 24 hours before testing for capacity at 7 mA and at 70 mA (approximately 12 mAh cells). The ESR was obtained by measuring the instant voltage drop at the specified current. Each cell type was prepared in duplicate, and the average of the two cells is shown below in Table 2.

TABLE 3

Supercapacitor Property Measurements

|  | Units | Comparative Supercapacitor Example 1 | Comparative Supercapacitor Example 2 | Inventive Supercapacitor Example 2 |
|---|---|---|---|---|
| Electrodes | Maxwell | Maxwell | Maxwell | Maxwell |
| Separator |  | NKK TF4030 | Comparative Example 2 | Example 1 |
| Capacity (7 mA) | mAh | 11.97 | 12.56 | 12.262 |
| Capacity (70 mA) | mAh | 10.35 | 10.09 | 9.60 |
| ESR | Ohms | 0.167 | 0.170 | 0.221 |
| Volume Capacity (7 mA) | mAh/cm³ | 11.66 | 12.22 | 12.53 |
| Volume Capacity (70 mA) | mAh/cm³ | 10.07 | 9.83 | 9.80 |

For these measurements, Volume Capacity equals Capacity/(0.244 mm+sep thickness (mm))*75 mm*25 mm, where "sep thickness (mm)" is the separator thickness in mm. These measurements show the increase in ESR with comparable capacity and volume capacity levels, showing effectiveness, at least, with an improved performance in this manner for the inventive separator supercapacitor.

Separators for lithium batteries were also prepared by blending EFTec L-010-04, EFTec A-010-04 and 0.3 denier polyethylene terephthalate fibers cut to 5 mm at a 40:40:20 blend ratio, with the separators prepared similarly to Comparative Example 2, above, this being Comparative Example 3. Additionally, the same uncalendered material was supercalendered according to the same procedure as Inventive Example 1, this on being Inventive Example 2. The material properties of these materials are shown below in Table 4.

TABLE 4

Measurements of Separators

| Test | Units | Comparative Example 3 | Inventive Example 2 |
|---|---|---|---|
| PET (0.3 dpf, 5 mm) | % | 20 | 20 |
| L-010-04 | % | 40 | 40 |
| A-010-04 | % | 40 | 40 |
| Average Material Density | g/cm³ | 1.34 | 1.34 |
| Basis Wt | g/m² | 17.05 | 17.73 |
| Moisture | % | 2.45 | 3.74 |
| Dry Basis Wt | g/m² | 16.6 | 17.1 |
| Thickness 7 psi | μm | 28 | 21 |
| Thickness 12 psi | μm | 27 | 19 |
| Thickness 25 psi | μm | 26 | 18 |
| Apparent Density (7 psi) | g/cm³ | 0.609 | 0.844 |
| Apparent Density (12 psi) | g/cm³ | 0.631 | 0.933 |
| Apparent Density (25 psi) | g/cm³ | 0.656 | 0.952 |
| Porosity (7 psi) | % | 55% | 37% |
| Porosity (12 psi) | % | 53% | 30% |
| Porosity (25 psi) | % | 51% | 29% |
| MD Tensile Strength | kN/m | 0.74 | 0.55 |
| MD Tensile Strength (12.6 psi) | kN/cm² | 2.74 | 2.89 |
| MD Tensile Stretch | % |  |  |
| CD Tensile Strength | kN/m | 0.44 | 0.38 |
| CD Tensile Strength (12.6 psi) | kN/cm² | 1.63 | 2.00 |
| CD Tensile Stretch | % |  |  |
| Breaking length |  | 3.0 | 1.6 |
| Young's Modulus | Ksi | 333 | 374 |
| Gurley | sec | 82 | 374 |
| Mean Flow Pore Size | μm | 1.11 | 0.539 |
| Bubble Point | μm | 22.45 | 3.164 |

Lithium batteries were also prepared by making a stack of ten double sided electrodes, the cathode consisting of lithium iron phosphate on aluminum and the anode consisting of graphite on copper, each cathode and anode pair separated by a layer of separator. The stacks were placed in a pouch and saturated with electrolyte, then sealed. The electrolyte used was a mixture of ethylene carbonate, dimethyl carbonate and diethyl carbonate mixed in a 4:3:3 volume ratio, with 1 mol/l of $LiPF_6$ salt. The batteries had a design capacity of 3 Ah, and were charged at C/6 to 3.6 V at constant current, then charged at constant voltage until the current reached 50 mAh. They were then discharged at a constant current of 500 mAh. Two more identical charge and discharge cycles were performed, with the third charge taken as the capacity of the cell. The cell was then charged to 900 mAh at constant current of 500 mA, and left to rest for 24 hours, with the voltage recorded at the beginning and end of the rest. The difference in these voltages was taken to be the 24 hour self-discharge. Cells were prepared with Celgard 2500 separator (Comparative Example 5), Dreamweaver Silver 25 separator (Comparative Example 6), Inventive Example 1 (Inventive Battery Example 1) and Inventive Example 2 (Inventive Battery Example 2). The results are shown in Table 3, below. In each case, two cells were prepared and the results averaged. FIG. 3 shows an example of the different components of a lithium ion battery, as well, that may be an embodiment of this invention.

TABLE 5

Lithium Battery Property Measurements

|  | Units | Comparative Example 5 | Comparative Example 6 | Inventive Battery Example 1 | Inventive Battery Example 2 |
|---|---|---|---|---|---|
| Separator |  | Celgard 2500 | Dreamweaver Silver 25 | Inventive Example 1 | Inventive Example 2 |
| Cell Capacity | mAh | 2852 | 2974 | 2936 | 2897 |
| Self Discharge Loss | mV | 37.2 | 30.6 | 71.9 | 39.9 |

The results thus show the improvements accorded through the thin, high density nonwoven bi-component battery separators in comparison with typical structures now utilized within the industry.

It should be understood that various modifications within the scope of this invention can be made by one of ordinary skill in the art without departing from the spirit thereof. It is therefore wished that this invention be defined by the scope of the appended claims as broadly as the prior art will permit, and in view of the specification if need be.

What we claim is:

1. A polymeric battery separator comprising a nonwoven combination of microfibers and nanofibers,
    wherein said microfibers and nanofibers are present as a single layer structure such that a plurality of said microfibers forms a base substrate and said nano fibers are present within the interstices between said plurality of microfibers as well as on the surface of the substrate formed from said plurality of microfibers,
    wherein said single layer nonwoven separator structure provides sufficient porosity for electrolyte transfer therethrough and suitable prevention of electrode contact through said a single layer structure,
    wherein said microfibers have a diameter greater than 2 microns and said nanofibers have a diameter less than 700 nm, and
    said single layer nonwoven separator exhibits a maximum thickness of 25 microns, a maximum porosity of 45%, a mean pore flow size of 0.7 microns, and a minimum tensile strength of 2 kN/cm².

2. The battery separator of claim 1 wherein a minimum apparent density of 0.7 g/cm².

3. The battery separator of claim 1 wherein said separator exhibits a minimum apparent density of 0.7 g/cm³.

4. The battery separator of claim 1 exhibiting a maximum thickness of 20 microns.

5. The battery separator of claim 4 exhibiting a maximum thickness of 15 microns.

6. The battery separator of claim 5 exhibiting a maximum thickness of 12 microns.

7. The battery separator of claim 1 exhibiting a maximum thickness of 20 microns.

8. The battery separator of claim 2 exhibiting a maximum thickness of 20 microns.

9. The battery separator of claim 3 exhibiting a maximum thickness of 20 microns.

10. A polymeric battery separator comprising a nonwoven combination of microfibers and nanofibers,
    wherein said microfibers and nanofibers are present as a single layer structure such that a plurality of said microfibers forms a base substrate and said nano fibers are present within the interstices between said plurality of microfibers as well as on the surface of the substrate formed from said plurality of microfibers,
    wherein said separator provides sufficient porosity for electrolyte transfer therethrough and suitable prevention of electrode contact through said a single layer nonwoven structure,
    wherein said microfibers have a diameter greater than 2 microns and
    said nanofibers have a diameter less than 700 nm, and
    said separator exhibits a maximum thickness of 25 microns, a minimum apparent density of 0.7 g/cm³, a mean pore flow size of 0.7 microns, a maximum porosity of 45%, and a minimum tensile strength of 2 kN/cm².

11. The battery separator of claim 10 exhibiting a maximum thickness of 20 microns.

12. The battery separator of claim 11 exhibiting a maximum thickness of 15 microns.

13. The battery separator of claim 12 exhibiting a maximum thickness of 12 microns.

14. A battery including the separator as defined in claim 1.

15. A battery including the separator as defined in claim 4.

16. A battery including the separator as defined in claim 10.

17. A battery including the separator as defined in claim 11.

18. A polymeric battery separator comprising a nonwoven structure comprising nanofibers,
    wherein said microfibers and nanofibers are present as a single layer structure such that a plurality of said microfibers forms a base substrate and said nano fibers are present within the interstices between said plurality of microfibers as well as on the surface of the substrate formed from said plurality of microfibers,
    wherein said separator provides sufficient porosity for electrolyte transfer therethrough and suitable prevention of electrode contact through said a single layer structure,
    wherein said nanofibers have a diameter less than 500 nm, and
    said separator exhibits a maximum thickness of 25 microns and a maximum porosity of 45%, a mean pore flow size of 0.7 microns, and a minimum tensile strength of 2 kN/cm².

* * * * *